Aug. 30, 1932. R. A. STEIGERT 1,875,276
AIRCRAFT OF THE HEAVIER THAN AIR TYPE
Filed Sept. 2, 1931
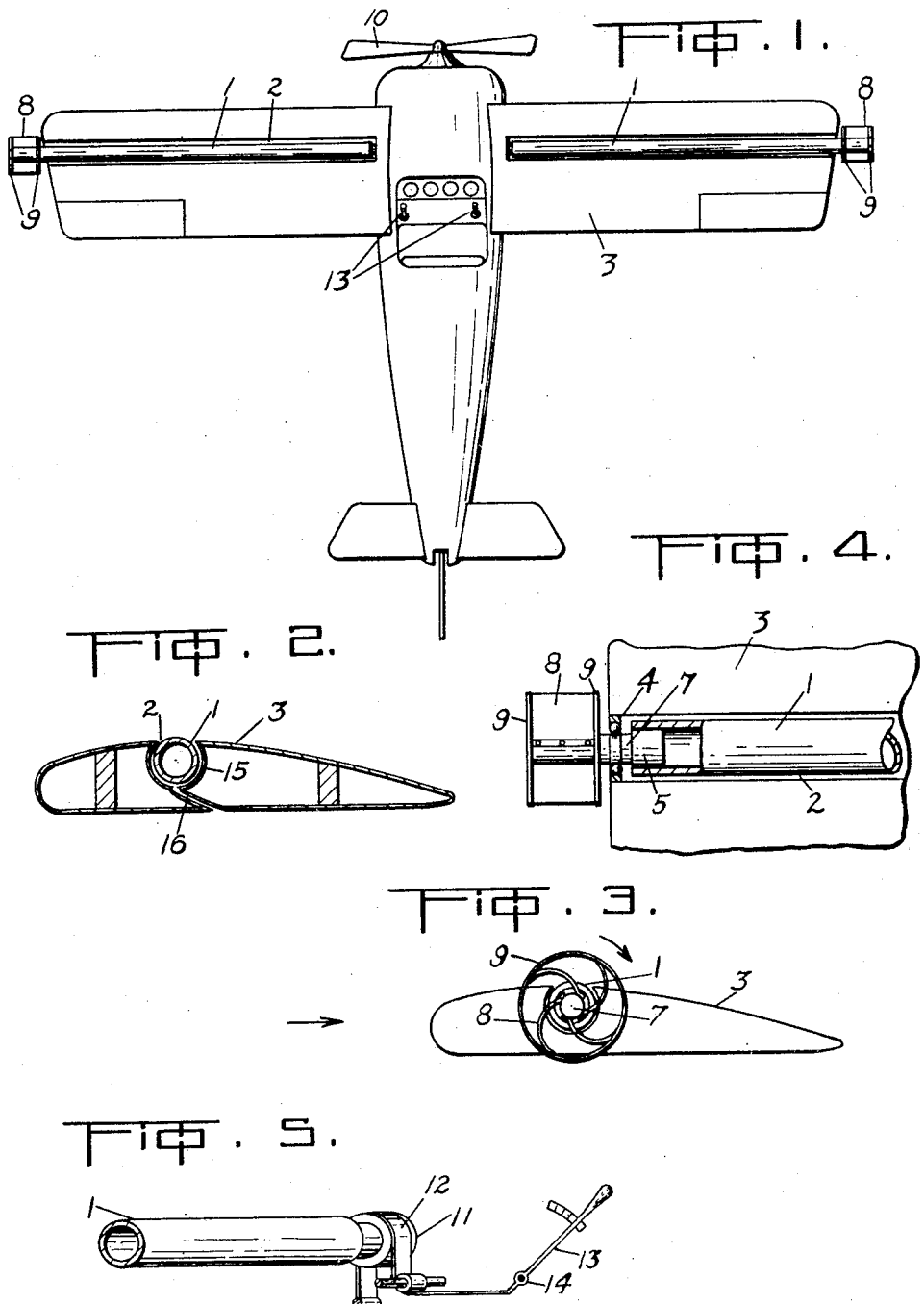
Inventor
ROBERT ADOLF STEIGERT
by Fetherstonhaugh & Co.
Attys.

Patented Aug. 30, 1932

1,875,276

UNITED STATES PATENT OFFICE

ROBERT ADOLF STEIGERT, OF BUFFALO, NEW YORK

AIRCRAFT OF THE HEAVIER THAN AIR TYPE

Application filed September 2, 1931. Serial No. 560,845.

My invention relates to improvements in aircraft of the heavier than air type, and the object of my invention is to incorporate a rotative element in aircraft for producing what is known as the Magnus effect, and by means of which I impart a greater coefficient of lift than is at present possible to obtain through the use of the standard airfoils.

A further object of my invention is to rotate the Magnus elements independently of the aircraft propulsion motor through the utilization of the wind impingement against the aircraft while taking off and also in flight.

Another object of my invention is to incorporate a plurality of rotative elements within the upper surfaces of the wings and to independently control the speed of rotation of each of the elements so that the rotative speed ratios between the various rotating elements can be governed in accordance with the requirements of the aircraft in its various gyrations in flight.

My invention consists of an aircraft constructed and arranged all as hereinafter more particularly described and illustrated in the accompanying drawing in which:—

Fig. 1 is a plan view of an aeroplane having Magnus cylinders incorporated in its wings in accordance with my invention.

Fig. 2 is an enlarged vertical cross sectional view through one of the cylinder containing wings.

Fig. 3 is a similarly enlarged view showing one of the wing tips and air vane members for rotating the cylinder contained within the wing.

Fig. 4 is also an enlarged view of a fragmentary portion of a wing and cylinder, showing the cylinder partially in cross section, and also the supporting bearing for the cylinder mounted within the wing, and Fig. 5 is a perspective view of a portion of one of the cylinders removed from the wing, together with a skelton view of a brake band mechanism which may be used for controlling the rotative speed of the cylinder.

Like characters of reference indicate corresponding parts in the different views in the drawing.

My invention is based upon the discovery of the German physicist Magnus who demonstrated that a rotating cylindrical body blown upon at right angles to its axis by a wind, not only offers the usual resistance, but also receives a force direct toward that side of it on which the relative wind speed and peripheral speed are almost equal, so that a rotating cylinder mounted upon a movable object for utilizing the energy of the wind produces a vacuum on that side of the cylinder adjacent to the wind and moving in the direction of the wind flow, whereby there is a pulling force produced upon the rotating cylinder in a direction substantially transverse to the direction of wind flow.

In my invention I incorporate a plurality of substantially horizontally positioned rotatable cylinders 1 in the wings of an aeroplane, preferably at the center of lift, such cylinders in the present instance, as illustrated in the drawing, being positioned so that their upper portions protrude through slots or openings 2 in the upper wing surfaces 3.

In Figure 1 of the drawing I have shown a cylinder mounted in each forward wing of the aeroplane, though of course, it is to be understood that I may locate one or more cylinders in any of the wings as so desired. These cylinders or rotors are mounted within suitable bearings, as for example, the ball race 4 shown in Figure 4 of the wing tip, the inner ends of the cylinders being similarly carried.

As I particularly desire to rotate the cylinders or rotors independently of the aircraft motor I furnish vane carrying members upon the outer faces of the cylinders exteriorly of the wing tips. These vane members can be constructed in any suitable manner and as illustrated in the drawing I form the cylinders 1 of hollow form for lightness, and in the outer ends furnish caps or plugs 5 from which project stub shafts 7 extending through the bearings or ball race 4. The outer ends of the stub shafts 7 carry the vane members which comprise a plurality of curved blades 8 extending from the stub shafts 7 and carry peripheral strengthening rings 9 to rigidly hold the blades.

Upon reference to Figure 3 it will be clearly seen that the curvature of the blades will cause the vane members to rotate in a direction as indicated by the arrow when impinged upon by an air current in the direction of the horizontal arrow, so that the upper exposed surfaces of the cylinders move in the same direction as the air current.

The aircraft as illustrated in Figure 1 apart from the rotating cylinders follows standard practice in that it is provided with the usual motor actuated air screw 10 by means of which the machine is propelled.

It will be apparent that when an aircraft constructed according to my invention is taking off or in flight that the forward movement of the machine under the influence of its propeller will cause the vane members to rotate with the consequent rotation of the cylinders, wherein their upper peripheral faces are moving in a rearward direction, or in the same direction as the air flow current upon the upper faces of the wings. If the required rotative speed of the cylinders is not obtained through the rotative speed of the vane members any suitable gearing for altering the relative speed can be established between the vane members and the cylinders, as for example, epicyclic gearings carried upon the ends of the cylinders and connected to the vane members.

The action of the air current in passing over the rotating cylinders produces a Magnus effect in creating a vacuum wherein a pulling force is produced transversely to the direction of the air current, and therefore, in the case of the aircraft in an upward direction thus increasing its lift.

Through a series of experiments carried out upon models a maximum lift coefficient of 9.48 has been obtained upon a 4.5 inch cylinder at 3,600 R. P. M., in an air stream having a velocity of 197 feet per minute, or a velocity ratio of 4.32. This lift coefficient is 7.5 times as great as that obtained with the standard airfoil as used on the majority of aeroplanes today. In the experimentation with this model a lift-to-drag ratio of 7.8 has been obtained at 2,100 R. P. M. with a velocity ratio of 2.51, whereas the lift-to-drag ratio of the standard airfoil is 18.5. The lift obtained by a given airfoil depends upon its maximum lift coefficient which in the standard airfoil is somewhere in the vicinity of 1.24. This maximum coefficient has been of late increased with the aid of slots and flaps to a maximum coefficient of 1.97 which is an increase of 56 per cent. With the rotating cylinders, however, a maximum lift coefficient of 9.48 was obtained or an increase of 665 per cent, and this obviously means that by my invention aeroplanes can be constructed to carry much greater loads and in which the landing speed can be very appreciably reduced through the utilization of the greater lift imparted by the rotors.

In order that the ratio of lift between the wings may be controlled for various manœuvers of the craft when in flight any suitable braking means may be incorporated for retarding the rotative speed of any of the rotating cylinders, and in Figure 5 of the drawing I have shown the inner end of one of the cylinders furnished with a cylindrical portion 11 having a brake band 12 extending therearound. The tension of the brake band 12 on the portion 11 is controlled by a swingable lever 13 which is pivoted at the point 14, a plurality of such levers being contained within the cockpit and actuatable by the pilot. This type of brake is of course illustrative in character. As rain or moisture would collect in the cylinder containing channels 15 in the wings I provide conduits 16 extending from such channels to the bottom surfaces of the wings for drainage purposes.

From the foregoing description it will be seen that I have devised a very simple construction for utilizing the Magnus effect in air craft and it is to be understood that my drawing is purely illustrative of the principles of my invention, and I, therefore, may make such changes and alterations as I may from time to time deem necessary without departing from the spirit of my invention as set forth in the appended claim.

What I claim as my invention is:

In an aircraft, a means for increasing the lift thereof, through the medium of the energy of the air flow from head to tail of the aircraft, comprising a plurality of substantially horizontal cylinders contained within the aircraft wings and only exposed through the tops thereof, vane members rotated by the flight of the craft through the air connected to rotate the cylinders wherein the surface of the cylinders exposed to the air flow move in the same direction as the flow, on which surface due to the Magnus effect, a vacuum is produced tending to move the cylinders in an upward direction, and independent manually actuated braking elements each operative upon a rotor.

ROBERT ADOLF STEIGERT.